United States Patent [19]

Sasaki et al.

[11] 4,413,657
[45] Nov. 8, 1983

[54] EXHAUST PIPE WITH VIBRATION DAMPING

[75] Inventors: Takesada Sasaki, Machida; Hiroshi Endo, Zama; Yoshimasa Zama, Sagamihara; Masahiko Shiraishi, Nakatsu; Yosinari Miura, Nakatsu; Masayuki Yamaguchi, Nakatsu, all of Japan

[73] Assignee: Nippon Steel Corporation, Tokyo, Japan

[21] Appl. No.: 300,398

[22] Filed: Sep. 8, 1981

[30] Foreign Application Priority Data

Sep. 9, 1980 [JP] Japan ............................. 55-125010

[51] Int. Cl.³ .............................................. F16L 9/14
[52] U.S. Cl. ................................... 138/149; 138/111; 138/113; 138/114; 60/322; 181/227; 181/228
[58] Field of Search ............... 138/111, 113, 114, 148, 138/149, 26, 30; 60/322; 181/196, 207, 208, 222, 228, 227, 256

[56] References Cited

U.S. PATENT DOCUMENTS 3,209,787 10/1965 Brown et al. .................... 181/228 X
3,263,772  8/1966 Irwin et al. ......................... 181/227
3,563,825  2/1971 Seguka et al. ................. 138/149 X

FOREIGN PATENT DOCUMENTS 243995  2/1912 Fed. Rep. of Germany ...... 138/148

Primary Examiner—James E. Bryant, III
Attorney, Agent, or Firm—Kenyon & Kenyon

[57] ABSTRACT

From the exhaust tube of automobiles the power source sounds and travelling sounds are radiated as noises. A heat-resistant intermediate layer is disposed partly around the inner tube of dual metal tubing and achieves decreases in the radiated noise from the exhaust pipe due to the vibration damping of the inner and outer tubes.

4 Claims, 11 Drawing Figures

EXHAUST PIPE WITH VIBRATION DAMPING

The present invention relates to a steel tubing and more particularly a composite dual tubing which can be suitably used for an exhaust pipe capable of effectively decreasing the radiated noise from the exhaust pipe of automobiles.

In the automobiles, an exhaust pipe connects the exhaust manifold to the muffler and allows the exhaust gas having a high temperature and a pulsating pressure to pass therethrough. The exhaust pipe radiates therearound noise, which is generated by the mechanical vibration of an internal combustion engine and then transmitted via a flange and the like, as well as the noise which is generated by the vibration of the exhaust pipe itself due to the pulsating exhaust gas. The automobile noises are divided into a group of power source sounds and a group of travelling sounds. The former group is caused by the engine, the radiator fan, the exhaust gas and the like. The latter group is caused by the rotational contact of tires with the road, the windage of an automobile body and the like. It is considered that the radiated noise from an exhaust pipe amounts to about 14% of the power source sounds. Research and development of steel tubings for the exhaust pipe proceeds, therefore, so as to decrease the radiated noise of the exhaust pipe and hence to provide automobiles with lower noises. The material of the exhaust pipe has been devised and the so developed ferritic stainless steel tubing for the exhaust pipe radiates reduced noise as compared with the radiated noise in the case of using the carbon steel exhaust pipes. The reduction effect of radiated noise is, however, not satisfactory and the exhaust pipe becomes expensive in the ferritic stainless steel exhaust pipe.

Most conventional exhaust pipes are made of a single steel tube and their soundproof effect is not appreciable, if any. The structure of the exhaust pipes has therefore been devised so as to decrease the radiated noise of such pipes. An example of the so devised and developed exhaust pipes is to use a dual tubing which may be also referred to as a double wall tubing.

The prior art is now described with reference to FIGS. 1 through 6.

Figure 8:
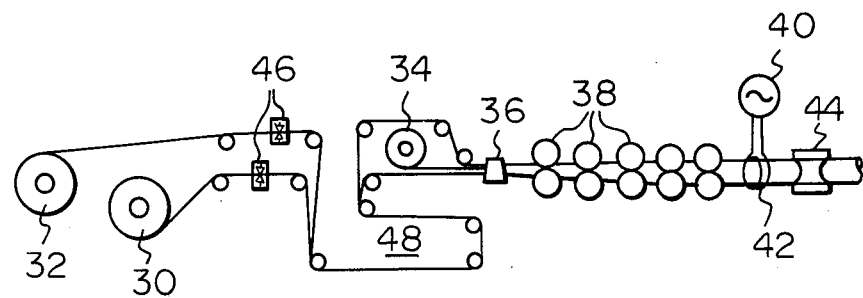
Figure 9:
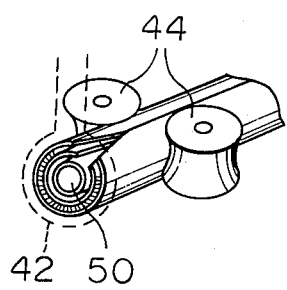
Figure 10:
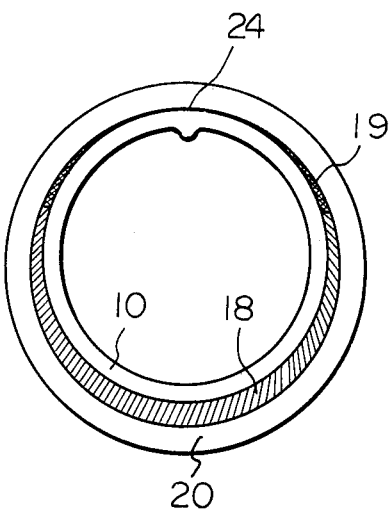
Figure 11:
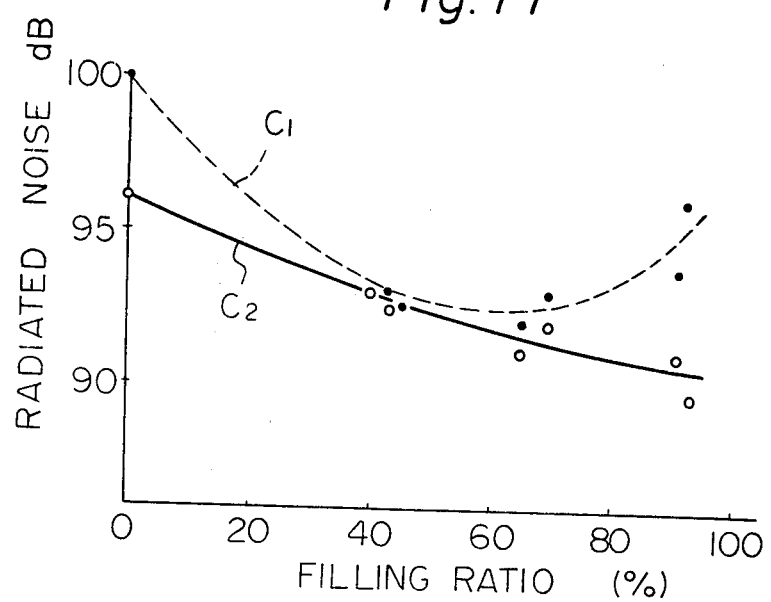

FIG. 8 schematically illustrates a process for manufacturing the composite dual tubing;

FIG. 9 illustrates a part of the process illustrated in FIG. 8;

FIG. 10 is a view of the composite dual tubing being manufactured, and;

FIG. 11 is a graph indicating the noise radiation property of a composite dual tubing.

Figure 1:
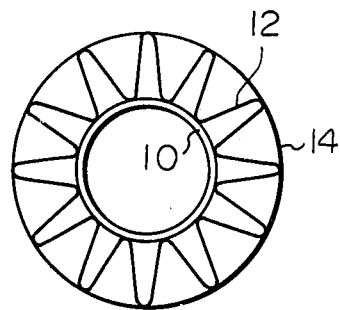
FIGS. 1 through 6 are views of known composite dual tubing for the exhaust pipe.
Figure 2:
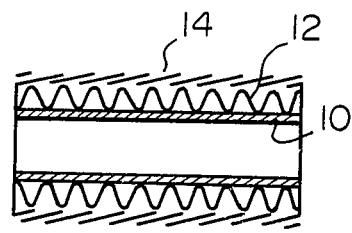
Figure 3:
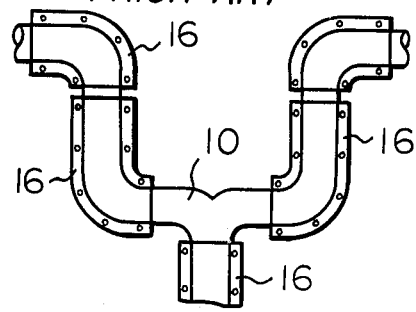
Figure 4:
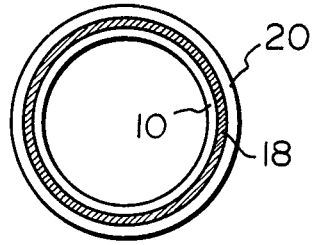
Figure 5:
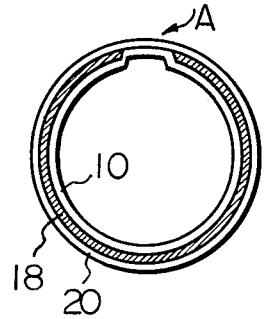
Figure 6:
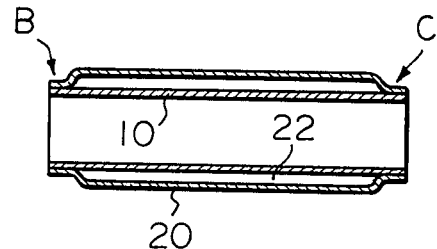

When the single tube is enclosed by the sound absorbing material or the sound insulating material, the radiated noise can obviously be decreased due to such enclosure as compared with the radiated noise from the exhaust pipe of conventional single tubing. Referring to FIGS. 1 through 3, examples utilizing the noise decreasing effect of the enclosure made of the sound-absorbing or sound-insulating material are illustrated. In FIGS. 1 and 2, the reference numerals 10, 12, and 14 designate an inner tube, the sound-absorbing or sound-insulating material, such as bestos and glass fiber, and a cover of an exhaust pipe, respectively. The cover 14 in FIG. 1 is embodied as a sheet and is elastic, while the cover in FIG. 2 is embodied as an armor like member. In order to satisfactorily decrease the noise by the composite dual tubings shown in FIGS. 1 and 2, the sound-absorbing or sound-insulating material 12 must be very thick, so that the whole tubings become disadvantageously bulky. In addition, it is complicated to attach the sound-absorbing or sound-insulating material around the inner tube 10, because the exhaust pipe is curved. Namely, when the attachment of sound-absorbing or sound-insulating material is carried out by a winding method, the material must be manually wound around the inner tube and therefore this method is not likely to be adapted in the mass production of composite dual tubings. As shown in FIG. 3, a method other than manual winding can be employed for attaching the sound-absorbing or sound-insulating material around the inner tube 10 of the exhaust pipe. In the method illustrated in FIG. 3, five half sections 16 of the sound-absorbing or sound-insulating material are shown. A pair of the upper and lower half sections are mounted on the inner tube 10 from both sides of the tube and then secured to each other by screws at dot points of a flange of these sections, as shown in FIG. 3. The workability of this method is higher than the winding method of the sound-absorbing or sound-insulating material. However, in the method illustrated in FIG. 3, half sections 16 must be provided in straight, curved or various shapes adapted to the shape of an exhaust pipe and must be selectively attached to the respective regions of the inner tube of exhaust pipe. This is a still complicated work of the method illustrated in FIG. 3. The dual tubings are advantageous in this regard because they can be mounted as exhaust pipes as simply as the single wall tubings. The dual tubings shown in FIGS. 4 and 5 are composite tubings with an insert 18 between the inner tube 10 and the outer tube 20. The composite dual tubing shown in FIG. 5 is different from that shown in FIG. 4 in the fact that the inner tube 10 and the outer tube 20 are directly in contact and secured or welded to one another at the portion A. The tubing shown in FIG. 6 is a dual tubing with a gap 22 which separates the inner tube 10 from the outer tube 20, and both tubes 10, 20 are secured to one another through portions B, C at the ends of the tubing. The dual tubings shown in FIGS. 5 and 6 turned out by the test by the present applicant to be effective occasionally for the reduction of radiated noise. However, such effect is drastically decreased when heating the dual tubings to a high temperature. The reduction effect of radiated noise of the dual tubing shown in FIG. 6 is only slightly thermally influenced, however, its reduction effect is not remarkable in the first place. In addition, since the inner and outer tubes must be secured to one another at the ends thereof or at an appropriate intermediate point between the ends, so as to prevent the inner tube from falling out of the outer tube during the tube handling, the working of tubes is disadvantageously complicated. Furthermore, when the dual tubing is subjected to bending, the inner and outer tubes are deformed so that the gap 22 may not be assured. In order to eliminate such problem, sand and the like are usually filled in the gap and then withdrawn from the gap after working of the tubes, which is a very complicated method. In this regard, the composite dual tubings shown in FIGS. 4 and 5 comprise the insert 18, which is filled between the tubes, and thus can be subjected to bending without a danger of causing direct contact between inner and outer tubes. However, as stated above, these composite dual tubings involve a problem in a drastic reduction of the radiated sound-reduction effect at a high temperature.

It is, therefore, an object of the present invention to improve the composite dual tubing, so that the radiated noise from the composite dual tubing can be kept at a low level at normal temperature and especially at high temperature. The composite dual tubing according to the present invention must be manufactured by a simple and reliable method.

In accordance with the objects of the present invention, there is provided metallic dual tubing comprising an inner tube and an outer tube, characterized in that the metallic dual tubing is provided with a heat-resistant intermediate layer inserted between the inner tube and the outer tube and having a thickness of from about 0.1 to 0.5 mm, the length of the heat-resistant intermediate layer as seen in the transversal cross section of the tubing amounting to from about 40 to 70% of the circumferential length.

The preferred embodiments of the present invention are hereinafter described with reference to FIGS. 7 through 10.

Figure 7:
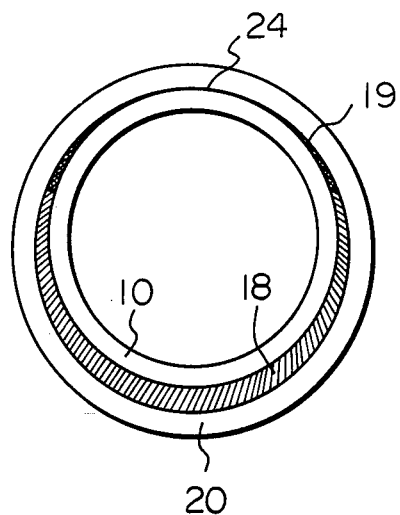
FIG. 7 illustrates a view of the composite dual tubing according to an embodiment of the present invention.

Referring to FIG. 7, a preferred embodiment of the composite dual tubing according to the present invention is illustrated. In FIG. 7, the insert 18, which is an integral or non-divided insert as seen in the transversal cross section, is tightly filled between the outer tube 20 and the inner tube 10. The insert 18 is made of heat-resistant material and is hereinafter referred to as the heat-resistant intermediate layer. The length of the heat-resistant intermediate layer 18 amounts to from about 40 to 70% of the circumferential length of the annular region between the inner and outer tubes. The thickness of the heat-resistant intermediate layer 18 is from about 0.1 to 0.5 mm. Strictly speaking, the thickness mentioned of from about 0.1 to 0.5 mm means the average thickness of the heat-resistant intermediate layer 18, after manufacturing the dual composite tubing, measured at several points around the annular region. However, since there is usually no such large thickness difference around the annular region as shown in FIG. 7, the heat-resistant intermediate layer 18 has almost a uniform thickness and hence the thickness on average is not of very great importance. The heat-resistant intermediate layer 18 consists of a single layer in the sheet form although multi layers may constitute the heat-resistant intermediate layer 18. At the annular region between the inner and outer tubes, where the heat-resistant intermediate layer 18 is not disposed, the gap 19 is formed and its length amounts to the remainder, i.e. from 30 to 60% of the circumferential length.

The inner tube 10 and the outer tube 20 may be separated from each other via the gap. Alternatively, these tubes 10, 20 may be brought into contact or fusion bonded with each other at the contact part or weld bead 24 as shown in FIG. 7. The gap 19 is, therefore, divided at the center thereof into two sections, and the adjoining ends of the divided two gas sections are very thin.

The material of the heat-resistant intermediate layer 18 may be one or more of glass cloth, asbestos, ceramic wool, rock wool and other heat resistant material retaining a vibration-damping effect at high temperature.

The inner and outer tubes may have the same wall-thickness. The wall-thickness of the outer tube 20 is preferably greater than that of the inner tube 10, in the light of the fact that a flange may be welded to the composite dual tubing.

A method for manufacturing the composite dual tubing according to the present invention is now described.

Referring to FIG. 8, the manufacturing method according to the electric tube-welding technique is illustrated. The manufacturing plant is provided with uncoilers 30 and 32 of strips for the outer and inner tubes, respectively, an uncoiler 34 of the intermediate heat-resistant material, such as a glass cloth, guide rolls 36, forming rolls 38, a high frequency-power source 40, a welding coil 42, squeezing rolls 44, a welding assembly 46 for a continuous supply of the strips, and a looper 48 which allows to supply the strips even during welding. The strips for the inner and outer tubes are drawn out from the uncoilers 32 and 30, respectively. The glass cloth is drawn out from the uncoiler 34 and is fed into between these strips. The strips and the glass cloth are bent into the tubular form by the forming rolls 38 and subjected to a high frequency induction-heating by means of the welding coil 42. The high frequency induction-heated steel edges are bonded or welded, while the strips are being pressed by the squeezing rolls 44. The strips are welded as illustrated in FIG. 9. The referene numeral 50 designates an impedor for decreasing the watt loss current, made of ferrite and the like. The composite dual tubing as welded by the method illustrated in FIGS. 8 and 9 has the cross section as shown in FIG. 10.

The composite dual tubing shown in FIG. 7 can be manufactured by preparing the inner smaller and outer larger tubes, which have preliminarily produced as tubular products, adhering intermediate heat-resistant material in the form of a sheet around the inner tube, advancing the inner tube into the outer tube and subjecting the outer tube and the inner tube with the adhered sheet mentioned above to reducing, thereby tightly binding the outer tube to the inner tube via the adhered sheet. During the reducing, the intermediate heat-resistant material is also compressed and its thickness is decreased. The thickness of the intermediate heat-resistant material adhered on the intermediate tube must, therefore, be so selected that the required thickness in the range of from about 0.1 to 0.5 mm is obtained after the tube reducing.

Not only the methods described above but any optional method for manufacturing the composite tubings can be utilized for manufacturing the composite dual tubing according to the present invention. No matter which method is utilized, the length of the heat-resistant intermediate layer is 70% at the maximum based on the circumferential length, with the result it is possible to provide a non concentric tubing, in which the inner tube is off set toward the outer tube and further the inner and outer tubes may be in contact with one another at the annular region where the heat-resistant material is not inserted.

The present invention is further explained by way of an Example.

In the table below illustrated are the results of testing the steel tubings of according to the present invention numbered as Nos. 4, 5, 8, 9, 10 and 13 and others steel tubings acting as comparative samples numbered as Nos. 1, 2, 3, 6, 7, 11 and 12. The steel tubings were dual tubings except that the steel tubing of Sample No. 1 was a single or single wall tubing with a diameter of 65 mm and wall thickness of 2.4 mm. The diameter of the dual tubings according to Sample Nos. 2 through 6 was 65 mm and the wall thickness of the inner and outer tubes of these dual tubings was 1.2 mm. The diameter of the dual tubings according to Sample Nos. 7 through 13 was 89.1 mm, and the wall thicknesses of the outer and inner tubes were 1.6 mm and 1.0 mm, respectively.

The test for measuring the radiated noise from the tubings was carried out as follows. The tubings having a length of 1000 mm were held at their ends by a carrying member comprising a chuck and a pivot. The steel balls were placed in the tubings and struck the inner wall of the tubings, while the tubings were caused to rotate by means of the supporting member. The radiated noise was measured by a sound level meter located near the tubings. The test was carried out at room temperature indicated in the table by "As Roll" and at elevated temperatures of 600° C., 700° C. and 800° C. The filling ratio in the table and FIG. 11 indicates the length of the heat-resistant intermediate layer based on the entire circumferential length of the annular gap.

| Sample No. | Glass Cloth Thickness (mm) | Glass Cloth Filling Ratio (%) | Sound Pressure Level by Internal by Vibrating (dB) As Roll | 600° C. | 700° C. | 800° C. |
| --- | --- | --- | --- | --- | --- | --- |
| 1 (control) | — | — | 105 | 104 | 104 | 104.5 |
| 2 (control) | no | no | 95.5 | 97 | 96 | 98 |
| 3 (control) | 0.2 | 80 | 91.5 | 98 | 97 | 97 |
| 4 (invention) | 0.2 | 65 | 92 | 92 | 92.5 | 92 |
| 5 (invention) | 0.2 | 50 | 92.5 | 93 | 92.5 | 92.5 |
| 6 (control) | 0.2 | 30 | 94 | 95.5 | 94.5 | 95 |
| 7 (control) | 0.2 | 90 | 92 | 97 | 96.5 | 98 |
| 8 (invention) | 0.2 | 55 | 91.5 | 92.5 | 92 | 92.5 |
| 9 (invention) | 0.2 | 45 | 92.5 | 92 | 91 | 92.5 |
| 10 (invention) | 0.4 | 55 | 89 | 92 | 92 | 93 |
| 11 (control) | 0.6 | 55 | 92 | 95 | 94.5 | 95.5 |
| 12 (control) | 0.8 | 55 | 92.5 | 97 | 96 | 96.5 |
| 13 (invention) | 0.1 | 55 | 94.5 | 95 | 94.5 | 95 |

As is apparent from the table above, the noise from the single tubing of Sample 1 was the highest. Sample 2 for comparison purposes was not provided with an intermediate material. The noise at "As Roll" of Sample 2 was 95.5 dB and higher than acceptable level of 95 dB, and the noise at elevated temperatures became higher. This is believed to be because the inner and outer tubes were in contact with one another at some parts thereof.

Sample Nos. 3 and 7 for the comparison purposes had a high filling ratio of 80 and 90%. The fact that the noise was low at room temperature but high at elevated temperatures in Sample Nos. 3 and 7 seemed to result from the high filling ratio which provided the dual tubing with an effect of the radiated noise reduction similar to that of composite dual tubing shown in FIGS. 4 and 5.

In Sample Nos. 11 and 12 for the comparison purposes, the thickness of the heat-resistant intermediate layer was 0.6 mm and 0.8 mm, respectively, and hence thicker than that proposed by the present invention. The radiated noise of Sample Nos. 11 and 12 at was high at elevated temperatures. Sample Nos. 4, 5, 8, 9 and 10 according to the present invention were characterized as compared with the other samples by low radiated noise at both room and elevated temperatures. The low radiation noise at elevated temperatures according to the characteristic of the present invention is very significant since the exhaust pipe flowing a high temperature gas therethrough is heated to a high temperature of from 600° to 800° C.

In Sample No. 13, the thickness of the heat-resistant intermediate layer was 0.1 mm and hence very thin, which seemed to provide the composite dual tubing with a noise radiation property similar to that of the dual tubing which had no intermediate layer.

Referring to FIG. 11, the variance of the rediated noise with the variance of the filling ratio is illustrated by the curve $C_1$, which indicates the composite dual tubings were heated at 600° C. for 5 hours, and the curve $C_2$, which indicates the composite dual tubings were at room temperature. As is apparent from FIG. 11, the filling ratio had to be selected within an appropriate range so as to control the radiated noise at elevated temperatures. The filling ratio was appropriately about from 40 to 70% and more appropriately from about 50 to 60%.

According to experiments by the present inventors, the radiated noise tended to be greater as the tubing diameter increased. The optimum thickness of the heat-resistant intermediate layer was not dependent on the tubing diameter appreciably.

The low noise radiation of the composite dual tubing according to the present invention can be explained as follows. The heat-resistant intermediate layer has a function of the vibration attenuator or vibration damper and attenuates or damps the vibration of the inner and outer tubes. Namely, when the inner and outer tubes vibrate, the heat-resistant intermediate layer is caused to slide or frictionally be displaced with respect to the tubes, with the consequence that the vibration of the tubes is damped. The intermediate heat-resistance layer does not only have the sound-absorbing and insulation function as the conventional tubings shown in FIGS. 1 through 3 but also have the sound damping effect which effectively decreases the radiated noise at elevated temperatures. In addition, since the vibration of the tubings is suppressed, it is possible to suppress the noise, which results from the pulsating exhaust gas and the vibration of the exhaust pipe due to as well as the noise, which results from engine vibration transmitted to and radiated from the exhaust pipe. The vibration damping by the heat-resistant intermediate layer is realized by defomability of the layer. If the heat-resistant intermediate layer were too compactly inserted between the inner and outer tubes under pressure to deform, the inner and outer tubes would be integrally combined with one another and thus would not be different from single tubing from the point of view of vibration. This could elucidate the reason why the composite dual tubings shown in FIGS. 4 and 5 does not exhibit a low noise-radiation property. In this regard, since the heat-resistant intermediate layer is not disposed entirely around the inner tube but the filling ratio is from 40 to 70% of the circumferential length, this layer seems to be able to still deform even under compression force which is exerted to this layer during the manufacture of tubings or an operation at elevated temperatures. The heat-resistant intermediate layer has, therefore, a vibration damping function. If the heat-resistant intermediate layer is thinner than about 0.1 mm, the vibration of the composite dual tubings seems to be equivalent to that of the dual tubings, which are provided with no intermediate layer. On the other hand, when the heat-resistant intermediate layer is thicker than about 0.5 mm, the inner and outer tubes are so isolated that they are vibrated independently of each other, which seems to result in non satisfactory vibration-damping.

We claim:
1. An exhaust pipe for discharging hot gas from an internal combustion engine comprising:

an inner tube and an outer tube, the inner surface of the outer tube and the outer surface of the inner tube defining an annular region therebetween;

a heat-resistant intermediate layer filled between said inner tube and said outer tube over the entire distance of said annular region as seen in the longitudinal direction of said inner and outer tubes and having a thickness of from about 0.1 to 0.5 mm, said heat-resistant intermediate layer comprising a continuous length of heat-resistant material, said length of said heat resistant material being from about 40% to 70% of the circumference of the annular region; and a gap left in the annular clearance where said heat-resistant material is not filled.

2. An exhaust pipe according to claim 1, characterized in that said inner tube is nonconcentric with respect to said outer tube.

3. An exhaust pipe according to claim 2, characterized in that said inner tube is offset relative to said outer tube so that a portion of the outer surface of the inner tube contacts a portion of the inner surface of the outer tube.

4. An exhaust pipe according to claim 1, wherein said heat-resistant intermediate layer has heat resistance at a temperature of the exhaust gas of automobiles.

* * * * *